United States Patent
Andrii et al.

(10) Patent No.: US 11,555,721 B2
(45) Date of Patent: *Jan. 17, 2023

(54) FLOW METER INCLUDING A COMBINED ULTRASONIC FLOW SENSING ARRANGEMENT AND A NON-ULTRASONIC FLOW SENSOR ARRANGEMENT FOR MEASURING WIDE RANGE OF FLOW RATES

(71) Applicant: ENERGOFLOW AG, Olten (CH)

(72) Inventors: Stetsenko Andrii, Kharkov (UA); Iurii Glova, Kharkov (UA); Sergii Nedzelskyi, Kharkov (UA)

(73) Assignee: ENERGOFLOW AG, Olten (CH)

( * ) Notice: Subject to any disclaimer, the term of this patent is extended or adjusted under 35 U.S.C. 154(b) by 134 days.

This patent is subject to a terminal disclaimer.

(21) Appl. No.: 16/979,136

(22) PCT Filed: Mar. 6, 2019

(86) PCT No.: PCT/EP2019/055600
§ 371 (c)(1),
(2) Date: Sep. 8, 2020

(87) PCT Pub. No.: WO2019/170767
PCT Pub. Date: Sep. 12, 2019

(65) Prior Publication Data
US 2020/0400473 A1 Dec. 24, 2020

(30) Foreign Application Priority Data
Mar. 8, 2018 (EP) .................................... 18160630

(51) Int. Cl.
*G01F 1/66* (2022.01)
*G01F 5/00* (2006.01)
(Continued)

(52) U.S. Cl.
CPC ................ *G01F 1/662* (2013.01); *G01F 5/00* (2013.01); *G01F 7/00* (2013.01); *G01F 15/14* (2013.01); *G01F 15/185* (2013.01)

(58) Field of Classification Search
None
See application file for complete search history.

(56) References Cited

U.S. PATENT DOCUMENTS

| 5,433,117 | A | 7/1995 | Taphorn et al. |
| 6,446,503 | B1 * | 9/2002 | Nukui ....................... G01F 7/00 73/197 |

(Continued)

FOREIGN PATENT DOCUMENTS

| WO | WO2008033035 A1 | 3/2008 |
| WO | WO2015004254 A1 | 1/2015 |

*Primary Examiner* — Harshad R Patel
(74) *Attorney, Agent, or Firm* — John Alumit

(57) ABSTRACT

The invention relates to a fluid flow meter comprising a measuring section for a flow indicator with different measuring methods for flow velocity and fluid flow rate, comprising a housing with an inlet channel, an outlet channel and at least one flow indicator located therein, a housing interior space forming a shape which is complementary to the geometry of the flow indicator, and comprising two bottoms at least partially defining the interior space, and a curved part having a geometry that ensures the formation of a flow, at least one ultrasonic flow indicator being arranged such that the measuring section thereof runs through an inner part of the other flow indicator with another operating mode, and the fluid flow meter comprises an adaptor unit for adapting different diameters of an outlet of the flow indicator and the outlet channel thereof.

4 Claims, 3 Drawing Sheets

(51) Int. Cl.
    *G01F 7/00*         (2006.01)
    *G01F 15/14*      (2006.01)
    *G01F 15/18*      (2006.01)

(56) References Cited

U.S. PATENT DOCUMENTS

| | | | |
|---|---|---|---|
| 10,969,263 B2 * | 4/2021 | Stetsenko | G01F 15/063 |
| 2003/0167836 A1 | 9/2003 | Mattar | |
| 2012/0055263 A1 * | 3/2012 | Konzelmann | G01F 1/34 |
| | | | 73/861.18 |
| 2015/0323364 A1 * | 11/2015 | Sakaguchi | G01F 5/00 |
| | | | 73/196 |
| 2015/0377691 A1 | 12/2015 | Ceglia et al. | |
| 2016/0282164 A1 | 9/2016 | Derevyagin | |

* cited by examiner

FLOW METER INCLUDING A COMBINED ULTRASONIC FLOW SENSING ARRANGEMENT AND A NON-ULTRASONIC FLOW SENSOR ARRANGEMENT FOR MEASURING WIDE RANGE OF FLOW RATES

BACKGROUND OF THE INVENTION

The invention relates to fluid flow meters according to the preamble of claim 1. Such flow meters/counters are envisaged for flow rate measurement and/or velocity measurement of the fluid flowing through their interior in a wide flow range.

Known fluid measurement methods have restricted flow ranges. The flow area ratios between the variable pressure gradient method and the Coriolis method are generally 1:10. The minimum-maximum flow ratio for the thermoanemometric measurement method is 1:15. In the turbine and vortex flow measurement method the ratio is 1:20, in the rotation method it is 1:100. This ratio can be 1:150 for the ultrasonic method.

If the liquid and gas flow is to be measured in a larger measuring range, several flow meters of different sizes and with different flow measurement profiles must be used. This makes the design of the metering unit much more difficult, increases its dimensions and requires a lot of time for maintenance and readjustment.

Known devices for expanding the measuring range are counters whose body contains one or more mass meters, as described, for example, in the documents EP2824432 A2 and CN104061973A. The flow range of the total flow in such meters depends on the number and size of the mass meters installed in the body. This solution has a very complex design, and is also expensive due to the many flow sensors required to ensure the measurement of large flow rates and volumes of gases, and thus has limitations for use as small (residential) meters. The above known solution also has the limitation of the low "internal scalability" of the sensors, since the flow sensors must be designed and manufactured for each individual class of flow meter. A significant disadvantage of this invention is also that the error in measuring the total flow rate includes both errors in the correlation of the total flow with the measured single flow sensor and the sum of errors of these single flow sensors.

CN102183274A, CN102735300A describe flow meters having a body in the form of an in-line section (a pipe section) with flow sensors installed, operating on various measurement methods, for example, vortex and ultrasonic. One of the methods (ultrasonic) measures the flow at a low velocity level (0.3-10 m/s). Another method (vortex) lies in the measurement of the flow velocity in the range from 5 to 45 m/s. The disadvantage of this solution is the in-line arrangement of flow sensors at opposite ends of the in-line section leading to an increase in its linear dimensions, bulkiness of the design and resulting in the impossibility of using it as residential meters. The location of one of the sensors (vortex) in the center of the in-line section, between the ultrasonic sensors, although it provides a decrease in the linear dimensions of the design, in turn introduces additional disturbances in the flow in the measuring channel, and leads to a deterioration in the metrological characteristics of the meter.

Patent WO2008033035A1 describes a fluid velocity measurement device, which is installed in eccentrically located openings of a pipeline section, at a certain angle relative to each other and the fluid flow, and also, preferably, outside the flow. A pressure transducer and an acoustic transmitter/receiver are envisaged in each mortise of the device, and the processor determines the flow rate based on the measurement results of both pressure transducers and acoustic transmitters/receivers. The disadvantage of this design is the configuration of the mortises and, under certain circumstances, of the measuring devices in the pipeline and the disturbances thus generated, which affect the uniformity of the flow pattern and thereby the measurement accuracy.

Application of this device, adapted to existing conditions, in particular, also as a residential meter, is challenging and expensive due to the existing design characteristics of the device.

Based on the above-mentioned prior art, the object of the invention is to eliminate these disadvantages.

The present problem is solved by using a fluid flow meter with characteristics that are described in formula 1.

SUMMARY

The present invention is a small-sized compact wide-range fluid flow meter which, in addition to being able to accommodate a certain measuring range, is also capable of operating in a larger measuring range than the flow meters of previous designs.

It is apparent that the present invention is implemented at least in the case when it comes to a fluid flow meter with a flow formation configuration and a combined measuring channel for flow sensors based on different measuring principles for measuring the flow velocity and flow rate of the medium and is represented as a device that includes the following structural components:

- a body with an internal chamber, the shape of which complements the configuration of the flow sensors; two bases that at least partially confine the inner chamber and one convex part, the configuration of which allows the formation of a flow,
- at least one ultrasonic flow sensor located in such a way that its measuring channel passes through the interior of the next flow sensor with a different measuring principle, and
- an adapter for matching different diameters of the outlet device of the flow sensor and its outlet channel.

A compact wide-range fluid flow meter with a flow-forming configuration and a combined measuring channel for flow sensors of different measuring principles is designed to measure the flow velocity and flow rate of a medium in a wide range of flows with a minimum to maximum flow ratio of 1:1000 or more. This flowmeter combines the advantages of a meter, which is designed to be insensitive to fluid disturbances at its inlet, and a meter with a measuring range far beyond the ranges of existing levels of measurement technology.

Further embodiments stem from the criteria of the dependent claims.

The first embodiment of the present device, which has advantages in terms of its operability and meets the criteria of formula 2, is characterized in that the inner chamber of the body has a cylindrical, elliptical or rectangular shape with a rounded base. In this case, the cross-sectional area of the inner chamber of the body by one order of magnitude (in the optimal case, not less than 10 times) exceeds the cross-sectional area of the flow meter inlet channel and the flow sensor outlet channel. Thus, the formed, stable and uniform fluid flow is directed to the outlet channel, due to which a laminar (non-vortex) fluid flow is achieved.

The second embodiment of the present device, which has advantages in terms of operability and meets the criteria of formula 3, is characterized in that the inner chamber has in the central part of the rounded base, either a bell-shaped fairing or a spherical fairing located next to the base. Thus, when passing through the inner chamber, the fluid bends around the fairing in accordance with its geometry (configuration) and is directed towards the center of the inner chamber, flowing down at the inlet of the flow sensor. In this case, the generated fluid flow flows through the inner space of the flow sensor and goes out through the outlet channel of the flow meter, due to which a laminar (non-vortex) flow of the medium is achieved.

The third embodiment of the present device, which has advantages in terms of expanding the flow range and meets the criteria of formula 4, is characterized in that the first ultrasonic flow sensor is located inside the fairing and/or the second ultrasonic flow sensor is located in the lower base of the inner chamber after the outlet of the flow sensor. In this case, both sensors are located in such a way that the acoustic channel passes through the central axis of the flow sensor, while the measuring flow channels are aligned with each other, thereby eliminating disturbances in the flow of the medium and achieving an expansion of the flow range.

The forth embodiment of the present device, which has advantages in terms of operability and configuration in accordance with the criteria of formula 5, is characterized in that the flow sensor, which prepares a proportional signal of the flow rate of the medium, is located in the center of the axis of the inner chamber, due to which the laminar (non-vortex) flow flows through and out of the flow meter outlet. In this case, any known flow rate or fluid velocity meters of the volumetric or mass principle of operation, which correspond to the structural size of the internal chamber of the flow meter body, can be used as flow sensors. Thus, the implementation of the laminar flow of the medium and the essential measuring principle of the invention, as well as the configuration of the flow meter in accordance with the actual measurement purpose in the production process or in practical application, is ensured.

The fifth embodiment of the present device, which has advantages in terms of expanding the measurement range in accordance with the criteria of formula 6, is characterized in that its operating principle is based on the use of two different measuring principles. At the same time, one of them is characterized by a particularly high degree of efficiency in the upper part of the flow range, while the other has a similar criterion in the lower part of the flow range. As a result of this solution, a wide measurement range is achieved with the ratio of the minimum measured flow rate to the maximum 1:1000 and more, while the use of two measurement methods also allows controlling the flow meter's performance. To do this, these two methods are compared in the middle of the flow range, in which the measurement results determined by these different methods are combined.

The sixth embodiment of the present device, which has advantages in terms of expanding or displacing the flow range and meeting the criteria of Formula 7, is characterized in that that the pipeline forms an additional flow bypass channel that is formed between the outer surface of the flow sensor and the inner surface of the additional pipeline. This solution divides the flow of the measured fluid, with part of the flow flowing through the interior of the flow sensor, and the other part of the flow flowing through the additional flow bypass channel.

The seventh embodiment of the present device, which has advantages in terms of operability and configuration in accordance with the criteria of formula 8, is characterized in that the gateway in the inner chamber is located in the center of the body base, which is located opposite the rounded base. Thus, the implementation of the laminar flow of the medium and the essential measuring principle of the invention, as well as the configuration of the flow meter in accordance with the actual measurement purpose in the production process or in practical application, is ensured.

The eighth embodiment of the present device, which has advantages in terms of operability and meets the criteria of formula 9, is characterized in that it has a flow preparation device located at the base of the inner chamber and is made in the form of a grid. In this case, the grid on the base of the inner chamber is located in such a way that the measured medium flows through the inlet channel and through the flow preparation device, and enters the inner chamber of the flow meter body. In this case, the flow preparation device splits the total flow of the measured medium into numerous separate flows, which ensures the implementation of a laminar (non-vortex) flow of the medium.

The ninth embodiment of the present device, which has advantages in terms of safety and meets the criteria of formula 10, is characterized in that inside the body there is a sensor for detecting fluid leaks, which is electrically connected to the electronic unit and/or the shut-off valve.

The tenth embodiment of the present device, which has advantages in terms of operability and meets the criteria of formula 11, is characterized in that the inlet of the flow sensor has a funnel shape and a connection with the fairing, which forms the flow of the medium.

The eleventh embodiment of the present device, which has advantages in terms of operability and meets the criteria of formula 12, is characterized in that the flow sensors and the adapter are matched, while the adapter is matched in accordance with the used flow sensor.

The twelfth embodiment of the present device, which has advantages in terms of operability and meets the criteria of formula 13, is characterized in that the inlet channel has a permanently installed coarse filter.

DRAWINGS

Hereinafter, a detailed explanation of an example embodiment of the invention is carried out with reference to the drawings:

The drawings show:

DETAILED DESCRIPTION OF THE INVENTION

Figure 1:
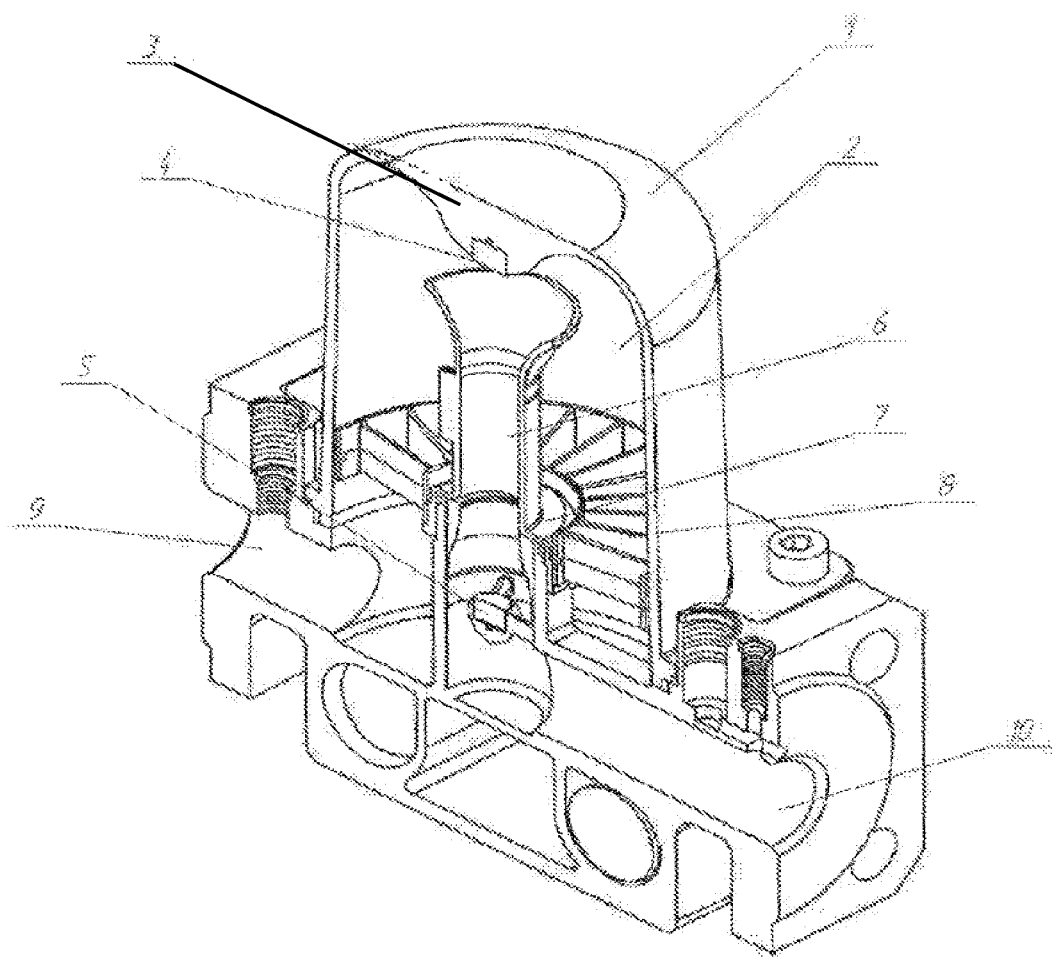
FIG. 1 illustrates a schematic cross-sectional view of a compact wide range fluid flow meter with a flow shaping configuration and flow sensors of different measurement principles.

A compact wide-range fluid flow meter with a flow-forming configuration and a combined measuring channel for flow sensors of different measuring principles is a device that includes the following components (FIG. 1):
- a body (1) having an inner chamber (2) and a fairing (protrusion) (3) configured to generate a flow;
- one or two ultrasonic flow sensors (4), (5), which are located inside the body of the flow meter and are designed to measure the flow rate of the medium;
- a non-ultrasonic flow sensor (6) of various operating principles (for example, thermoanemometric), located inside the body (1) of the flow meter and designed to measure the flow rate of the medium, while the flow meter has a funnel-shaped inlet;
- an adapter (7) for matching different diameters of the flow sensor (6) and outlet (10) with each other;
- a flow preparation device (8), designed to split and stabilize the flow of the measured medium;
- an inlet channel (9) of the measured medium flow;
- an outlet channel (10) for the flow of medium flowing out of the flow meter;
- an electronic unit;
- a coarse filter inside the inlet channel 9;
- a shut-off valve inside the inlet channel 9;
- a receptor sensor for fluid leaks.

The body (1) of the flow meter has an inner chamber (2) that forms a flow chamber impermeable to the working medium. This inner chamber (or cavity) (2) is designed to form and measure the flow rate of the fluid. The inner chamber (2) of the body (1) complements the shape of the flow sensor (6). Various shapes of this flow sensor are allowed, for example, a cylinder, elliptical tube, rectangular parallelepiped or any other shape, while one of its bases of the flow sensor is rounded. As seen in the first embodiment in FIG. 1, one of the cylindrical bases has an inwardly curved element, or fairing (3). The body (1) has a main inlet (9) and a main outlet channel (10). The main inlet channel (9) transports the medium flow to the inner chamber (2). The main outlet channel (10) is provided for the working medium that flows out of the inner chamber (2). A flow preparation device (8) is permanently installed inside the body (1). This device is designed to split and stabilize the flow of the measured medium. In addition, one or two ultrasonic flow sensors (4), (5) and one flow sensor (6) with different operating principles are installed inside the body (1). One of the ultrasonic flow sensors is located in a mounting seat inside the fairing (3). The second ultrasonic sensor is located in a mounting seat at the bottom of the inner chamber (2) inside the adapter (7). The flow sensor (6) of various operating principles is located inside the central part of the indicated body (1) of the flow meter. FIG. 1 does not show an electronic unit for evaluating measuring signals, a coarse filter for cleaning the medium, a shut-off valve for interrupting the flow of the medium, and a leak receptor sensor for identifying hazards.

The flow meter working principle is as follows:
- the measured medium first enters the inlet channel (9); passes through a coarse filter, a flow preparation device (8) and is split into numerous separate flows;
- these flows are distributed over the entire volume of the chamber (2), move along its central axis from one base to another in the space formed by the inner surface of the walls of the body (1) and the outer surface of the flow sensor (6). Then they flow around the inner protrusion (fairing) (3), repeating its shape. At the inlet of the funnel-shaped flow sensor (6), they converge to form a steady, uniform flow. This provides the most favorable conditions for high-precision measurement of its speed;
- then the funnel-shaped inlet of the flow sensor (6) combines the individual flows into a single one, thereby increasing the flow rate of the medium and reducing the sensitivity of the measuring process to interference inside the flow sensor (4);
- then this flow passes through the inner cavity of the flow sensor (6) and flows out of it through the main outlet channel (10) of the flow meter;
- when the flow of the working medium flows through the inner cavity of the flow sensor (6), the flow sensor (6) generates a signal proportional to the flow rate.

Figure 2:
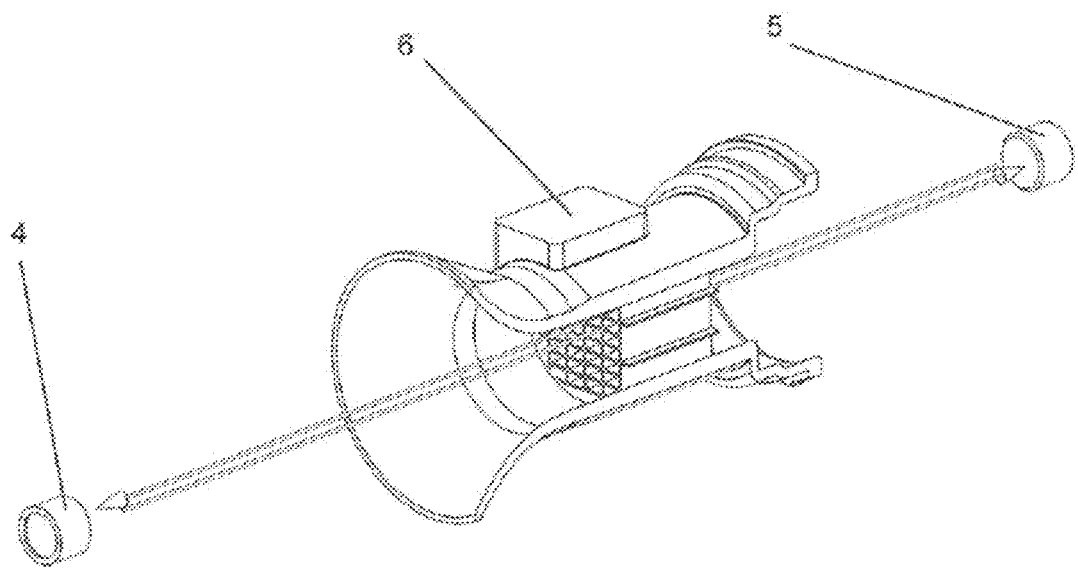
FIG. 2 illustrates a diagram of a combined measuring channel and the path of the acoustic channel of ultrasonic sensors.

A distinctive feature of the invention is the use of ultrasonic flow sensors (4), (5). One of these sensors (4) is installed inside the fairing (3), and the second one (5) is located after the flow sensor (6) at its outlet. Another difference is the arrangement of the flow sensors (4), (5) in such a way that the measuring channel formed between them passes through the central inner part of the flow sensor (6) without affecting its operation (FIG. 2). Thus, there is a spatial alignment of the measuring channel of the ultrasonic flow sensors (4), (5) and the measuring channel of the flow sensor (6).

The present differences ensure compact placement of sensors (4), (5), (6) inside the chamber (2) and, consequently, small dimensions of the flow meter itself, while maintaining its high metrological characteristics.

Measurement signals received from the sensors (4), (5) are also received and processed by the electronic unit of the flow meter with subsequent generation of a signal proportional to the volumetric flow rate of the working medium.

The body (1) consists of two parts (FIG. 1):
- the fixed part (base), which contains the inlet channel (9), coarse filter, shut-off valve, main outlet channel (10), flow preparation device (8), adapter (7), flow sensors (4), (5), (6);
- a moving part in the form of a cylinder (cap) with a rounding in one of the bases, which can rotate along its central axis. An electronic unit can be mounted on the outer moving part of the body (1), in which the front part can also rotate around its central axis.

The flow preparation device (8) comprises a grid. In this case, the grid is located in the lower cylindrical part of the chamber (2) so that the measured medium passes through the inlet channel (9) through the flow preparation device (8) and enters the chamber (2) of the body (1) of the flow meter. The grid of the flow preparation device (8) is a set of blades with a number of at least 21 and such dimensions that they overlap no more than 23% of the total cross-sectional area of the chamber (2). The flow preparation device (8) splits the flow of the measured medium, ensures the conditions for creating a uniform stable flow, and thereby significantly reduces the effects caused by the high energy of the turbulent flow at the inlet of the flow sensor (6). The use of the flow preparation device (8) in conjunction with the described configuration of the chamber (2) ensures the stabilization of this flow, the alignment of its velocity diagram, and thereby eliminates the need for external devices designed to create an undisturbed gas flow (adapters) at any, even significant, distortion and disturbance of the measured medium flow at the flow meter inlet.

An additional distinguishing feature of the flow meter is the presence of an adapter (7) for matching the diameters of the flow sensor (6) and the main outlet channel (10) of the flow meter located in the lower inner part of the body (after the outlet of the flow sensor). This adapter allows the use of flow sensors (6) of various diameters in the flow meter, depending on the required range of measured flow rates, while it is allowed to use an adapter that matches the parameters of the flow sensor.

The inlet channel (9) of the medium flow is an opening, a channel that directs the flow of the fluid into the chamber (2) of the body (1) of the flow meter.

The main_outlet channel (10) is designed to output the flow of fluid flowing out of the chamber (2) of the body (1) of the flow meter.

The electronic unit is used to determine, process and save the values and the results of processing the values, which the flow sensors (4, 5, 6) transmit to the electronic control system. The type of electronic unit is allowed to vary depending on the needs of the implementation, in addition, it does not significantly affect the present invention. The electronic unit interfaces with flow sensors (4, 5, 6) through a physical communication channel. The term "physical communication channel" means a connection through one or more solid bodies, for example, plugs, cabling, or wireless connection through radio communication, for example, Wi-Fi (wireless internet), Bluetooth. The electronic unit can be installed both on the outside of the meter body (1) and inside the case.

It is allowed to install a coarse filter inside the inlet channel (9) of the meter, which serves to clean the fluid from foreign bodies that can contaminate and damage the flow meters (4, 5, 6) or the flow preparation device (8).

In addition, a shut-off valve can be installed inside the inlet channel (9) to block the flow of the medium based on the signal from the electronic unit.

An additional medium leak detection sensor is used to safely detect fluid leakage from the meter, i.e. it triggers the shut-off valve and thus interrupts the flow of fluid into the meter. This sensor is essential for ensuring the operational safety of combustible media, the leakage of which can lead to an accident with serious consequences. Leak detection and flow blocking are also performed independently of the flow meter.

The flow sensor (6) is a meter (sensor, flow tube) of the volumetric flow rate or flow velocity of any principle of operation. The sensor is placed in the center of the cylindrical chamber (2) of the body (1) of the flow meter in such a way that the measured medium passes through the inlet channel (9) through the flow preparation device (8), is split into multiple flows, then passes through the chamber (2), flows around the protrusion (3), is combined in the center of the chamber (2) into a single uniform stable flow, which passes through the flow sensor (6) and exits the flow meter through the main outlet channel (10). As a flow sensor (6), any known flow rate or flow velocity meters of a volumetric or mass principle of operation (turbine, rotary, anemometric, etc.) with dimensions corresponding to the dimensions of the inner chamber (2) of the body (1) of the flow meter can be used. Therefore, there is no need to further describe this flow sensor (6). In any case, the flow sensor (6) detects data that directly or indirectly indicate the volume of the medium passing through the pipe and through the flow meter.

Figure 4:
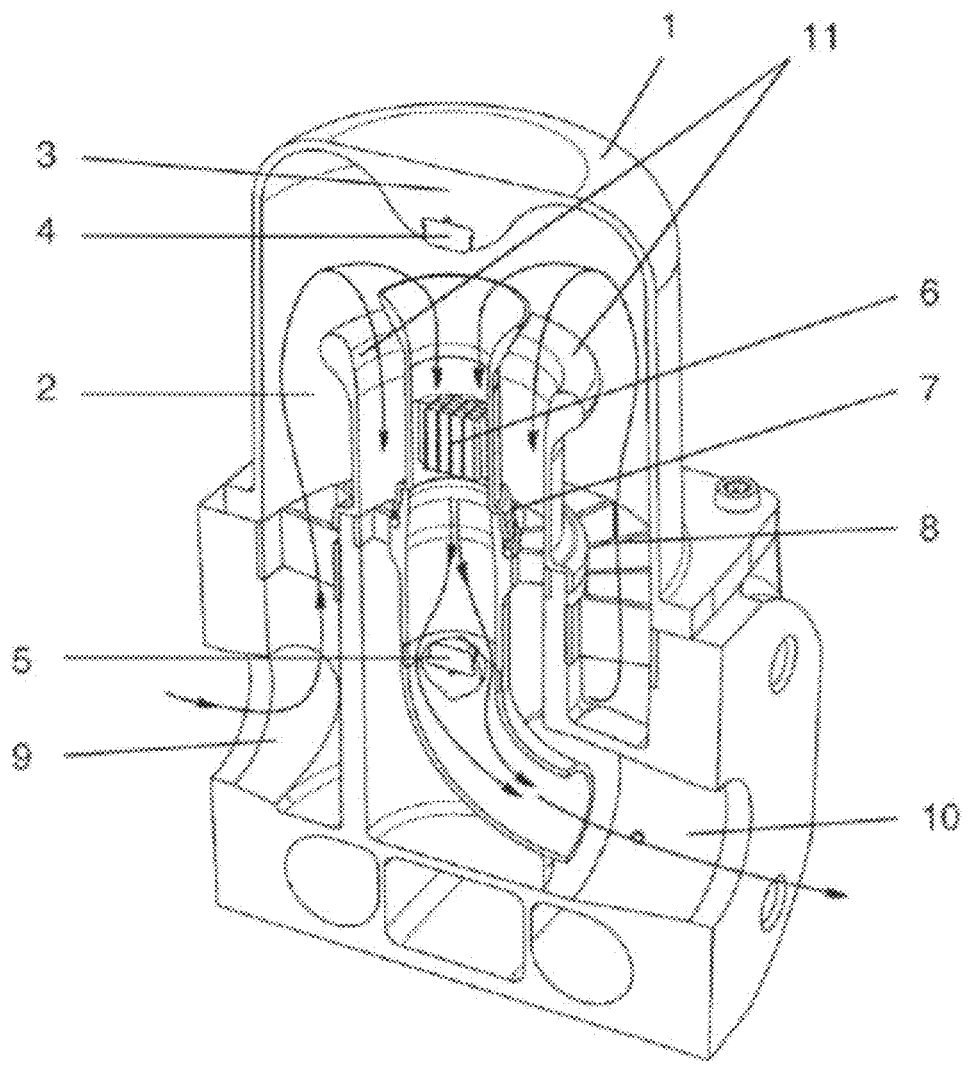
FIG. 4 illustrates an embodiment of a compact wide range fluid meter with an additional bypass path for the medium to be measured.

At the same time, when the flow passes through the flow sensor (6), the flow velocity is measured by the ultrasonic method. Ultrasonic sensors (4), (5) are placed in such a way that the optical channel between them passes through the central axis of the flow sensor (6) without affecting its operation (FIG. 4). Such placement of ultrasonic sensors (4), (5) and flow sensor (6) provides a number of advantages: the most favorable conditions for ultrasonic measurement, compact placement of sensors in the flow meter body and, as a result, small dimensions of the entire flow meter and its high metrological characteristics.

The implementation of the two methods provides the ability to measure the flow rate and flow rate of the fluid in a wide range. For example, the thermoanemotetric method provides high-precision measurements in the flow velocity ranges from 0.03 to 0.5 m/s. The ultrasonic method can provide flow measurements in a velocity range of 0.1 to 30 m/s. Thus, the ratio of the minimum and maximum measured flow rates can reach a value of 1:1000. An additional advantage of the implementation of the two methods is the ability to compare the measurement results obtained by different methods. The present process is implemented in the middle part of the ranges, i.e., in this section, both methods demonstrate efficiency.

Measuring signals from flow sensors with different operating principles are received and processed by the electronic unit of the flow meter with subsequent generation of a signal proportional to the volumetric flow rate of the working medium. The choice of the measurement method during the operation of the flow meter, depending on the flow rate, as well as the processing and recording (storage) of the results is carried out in the electronic unit of the flow meter in accordance with the algorithms written in its memory.

Figure 3:
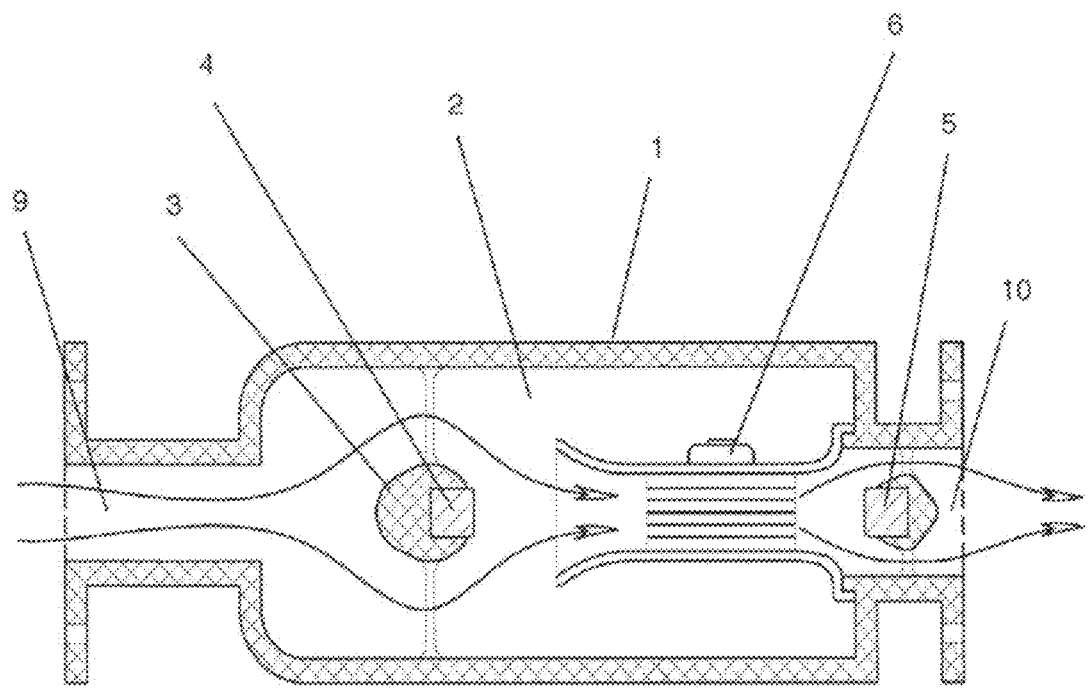
FIG. 3 shows an embodiment of a wide-range flow meter in the inlet section.

FIG. 3 shows the second embodiment of a wide-range flow meter in the inlet section, while (in FIG. 3) there is no electronic unit, a coarse filter, a shut-off valve, a receptor sensor for medium leaks, as well as a flow preparation device and a transition device (8) inside the transition from inlet (9) to inner chamber (2) and from inner chamber (2) to a main outlet channel (10). In this embodiment, the in-line section (pipeline section with flanges) is used as the body (1), which forms the inner chamber (2). In the central part of the inner chamber (2) there is a fairing (3), inside which an ultrasonic flow sensor (4) is installed. Another ultrasonic sensor (5) is placed after the flow sensor (6) (in the direction of flow) at its outlet. The principle of operation of this embodiment of the flow meter is completely identical to the embodiment shown in FIG. 1. That is, the measured flow through the inlet channel (9) enters the inner chamber (2), the diameter of which exceeds by many times the diameter of the inlet channel (9). In this case, the flow is dissected by means of a flow preparation device (8). Further, the flow goes around the fairing (3), passes through the flow sensor (6), flows through the adapter (7) and flows out of the flow meter through the main outlet channel (10). The measurement of the flow rate of the medium can be carried out by one of the methods depending on the flow rate.

FIG. 4 shows an embodiment of a wide-range flow meter, in which the flow sensor (6) is located in an additional tube (11) that provides a bypass channel for the measured medium. The tube (11) serves as a flow bypass for the medium to be measured. Otherwise, the principle of operation of this embodiment of the flow meter and its basic construction are identical to the embodiment in FIG. 1. The tube (11) has a funnel-shaped opening, which is similar to the opening of the flow sensor (6).

In this embodiment of the flow meter, the medium to be measured first enters the inlet channel (9). Then the medium enters the inner chamber (2), the diameter of which exceeds by many times the diameter of the inlet channel (9), flows through the flow preparation device, then along the space formed by the inner surface of the body walls (1) and the outer surface of the flow sensor (6), bypasses fairing (3), following the geometry of the latter. Then the flow of the medium is split. Part of the flow, as in the previous embodiment, flows through the interior of the flow sensor (6) and out through the main outlet channel (10) of the flow meter. Another part of the flow passes through an additional bypass channel. This bypass is the space formed between the outer surface of the flow sensor (6) and the inner surface of the tube (11). This bypass channel is advantageous if the portion of the flow to be measured is either significantly widened or offset, however, without changing the design size of the flow sensor (6) and the design of the medium flow pipelines.

As additional alternatives to the wide range fluid meter, the following designs are possible:
- a flow meter that uses two identical processes to measure the flow of a fluid;
- a simplified version, in which only one process of measuring the flow rate is used. In this case, a hollow tube is integrated in a shape (configuration) that is similar to that of the flow sensor (6).

Such simplified embodiments are possible if the consumer does not have a need for a wide range of medium flow measurement.

The advantages of the invention are the following technical solutions:
- the presence of a fairing (3) in the central part of one of the bases of the inner chamber of the flow meter or fairing, located near one of the bases of the inner chamber (2), which, due to a certain shape (bell, sphere or teardrop shape), ensures the narrowing and formation of the flow in the central part of the chamber (2) at the inlet of the flow sensor (6), as well as increasing the flow rate of the medium;
- the presence of an adapter (7), which allows the use of a volumetric flow sensor or anemometer of any brand with any principle of operation and various installation dimensions as a flow sensor (6);
- the use of flow sensors (6) of various measurement principles (principle of operation) will make it possible to choose such design dimensions of the flow sensors (6) which ensure the presence of a large cross-sectional area of the inner chamber (2);
- the large-sized area of the cross-sectional chamber (2) provides insignificant pressure losses of the medium inside the meter;
- since the cross-sectional area of the internal chamber (2) of the flow meter by one order of magnitude (in the optimal case, not less than 10 times) exceeds the cross-sectional area of the inlet channel (9) of the meter, the flow velocity of the measured medium decreases significantly after the flow enters through the inlet channel (9) into the inner chamber (2). Ultimately, the flow rate becomes smoother and more stable. Then the flow passes through a flow meter, the diameter of which is many times smaller than the diameter of the inner chamber (2), after which the flow is accelerated. This solution provides favorable conditions for highly accurate measurement of the flow rate and, additionally, reduces the degree of influence of external disturbing factors. Thus, the flow meter will almost completely lose sensitivity to disturbing noise that is generated inside the pipeline due to local resistance.
- since the claimed flow meter has flow sensors (4, 5, 6) that use two different measuring processes, and a common measuring channel, compactly located inside chamber 2, a wide measurement range is achieved with a ratio of the minimum measured flow rate to the maximum 1:1000 and more.

Thus, the result of the present invention is a flow meter for liquids and gases with a significantly extended measuring range. This flow meter provides high metrological characteristics. At the same time, it differs in compactness, small overall dimensions and insensitivity to disturbances of the measured medium at the input. The use of two principles (methods) of measurement also allows checking the operation of the flow meter by comparing these two methods in the middle part of the range, where there is an overlap of measurement results obtained by different methods, which provides a higher reliability of the measurement results.

The invention claimed is:

1. A fluid flow meter with a wide measurement range of flow sensing, using multiple flow sensor arrangement of different measuring principles to determine the flow velocity and flow rate of the medium, the fluid flow meter comprising:
a body having an inner chamber, arranged between an inlet and a main outlet,
the flow sensor arrangement includes at least one ultrasonic flow sensor arrangement and a non-ultrasonic flow sensor arrangement provided centrally in the inner chamber, wherein the inner chamber is formed concentrically between the body and the flow sensor arrangement,
wherein, the centrally arranged flow sensor arrangement includes a confining base formed of a fairing having a funnel-shaped inlet to provide flow formation, a flow passage and an outlet,
wherein, the at least one ultrasonic flow sensor is positioned to control flow of the medium through the flow passage and the non-ultrasonic flow sensor provided on the flow passage inside the body to measure the flow of the medium through the passage; and
wherein, said flow meter further includes an adapter for matching different diameters to the outlet of the non-ultrasonic flow sensor and the main outlet.

2. The fluid flow meter according to claim 1,
wherein, the at least one ultrasonic flow sensor includes, a first ultrasonic flow sensor located inside the fairing and a second ultrasonic flow sensor located in a lower base of the inner chamber after the outlet of the non-ultrasonic flow sensor, and an acoustic beam passes through a central axis of the passage between the first and second ultrasonic flow sensors.

3. The fluid flow meter according to claim 1, wherein, a tube concentrically arranged in the inner chamber forms a flow bypass channel around the flow sensor arrangement, wherein, the tube is arranged between the outer surface of the flow sensor arrangement and an inner surface of the body, due to which the flow of the fluid is separated, while part of the fluid flows through the passage of the flow sensor arrangement and the other part of the flow flows through the bypass channel.

4. The fluid flow meter according to claim 1, wherein, the non-ultrasonic flow sensor and adapter are matched, while the adapter is matched in accordance with the used non-ultrasonic flow sensor.

* * * * *